May 4, 1926.
W. L. SLAYTON
ELECTRIC SWITCH
Original Filed Jan. 26, 1924
1,583,194
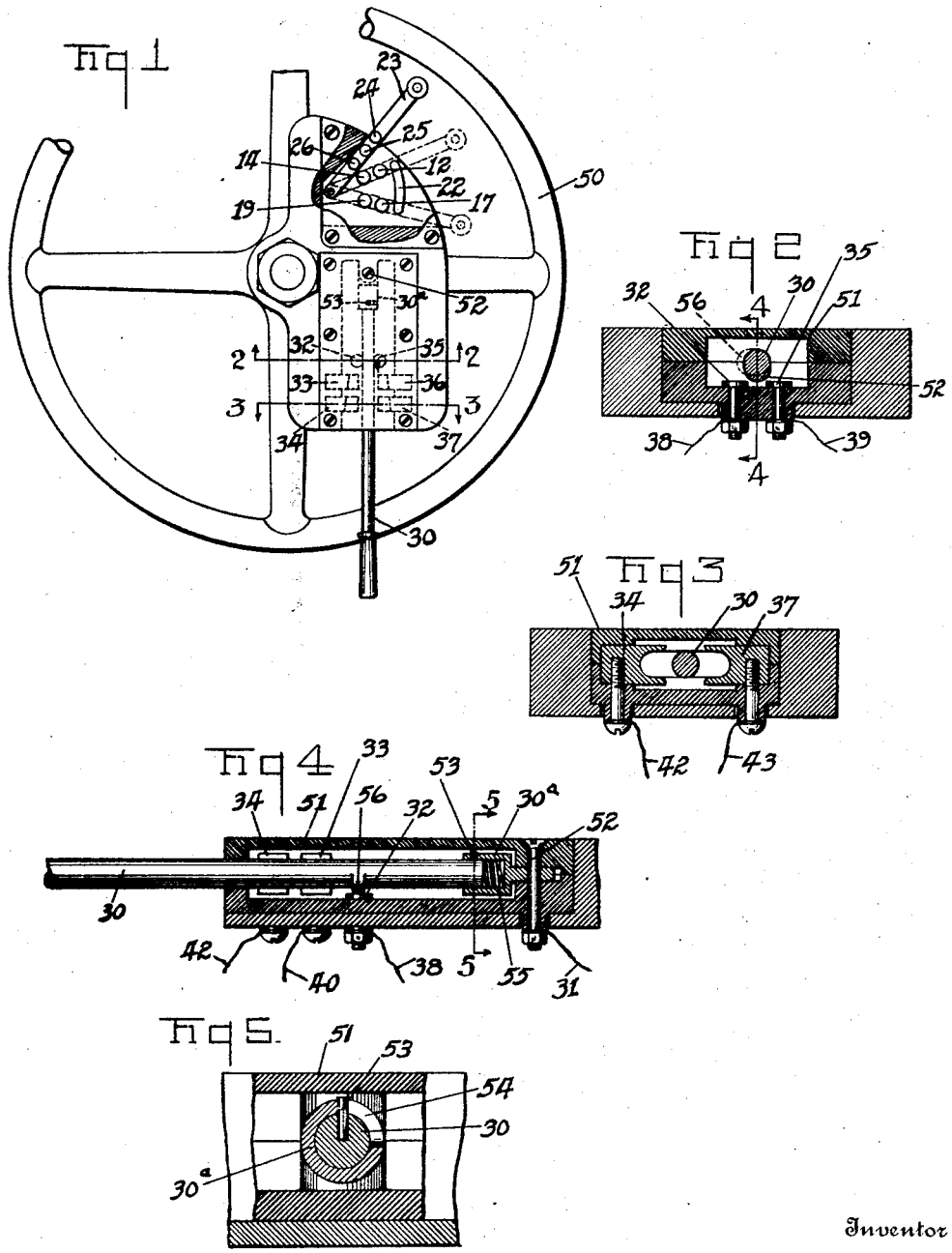

Patented May 4, 1926.

1,583,194

UNITED STATES PATENT OFFICE.

WALTER L. SLAYTON, OF TOLEDO, OHIO.

ELECTRIC SWITCH.

Original application filed January 26, 1924, Serial No. 688,749. Divided and this application filed June 24, 1925. Serial No. 39,181.

*To all whom it may concern:*

Be it known that I, WALTER L. SLAYTON, a citizen of the United States, and a resident of Toledo, in the county of Lucas and State of Ohio, have invented a new and useful Electric Switch, which invention is fully set forth in the following specification.

This invention relates to a signal system, and particularly to a light signal system, for use on automobiles and other vehicles to indicate preferably at both front and rear of the vehicle when it is intended to turn the same either to the right or to the left, and is a division of my copending application Serial No. 688,749 filed Jan. 26, 1924.

Objects of the invention are to provide means for normally controlling the signalling and also of throwing the headlights, or one set of front lights, so far as signalling is concerned, out of commission during daylight driving; and to provide a new and improved switch having the unique features of construction, arrangement and operation hereinafter described.

The invention is fully described in the following specification, and while in its broader aspect it is capable of embodiment in numerous forms, one embodiment thereof is illustrated in the accompanying drawings, in which,—

Fig. 1 is a view of the steering wheel with the lighting and signal controls associated therewith, parts of both being broken away. Figs. 2 and 3 are enlarged cross-sections on the line 2—2 and 3—3, respectively, in Fig. 1. Fig. 4 is a section of the signal control means on the line 4—4 in Fig. 2 with parts in full. Fig. 5 is a section on the line 5—5 in Fig. 4.

A manually operable light-control switch lever 23 is provided and has three bridging contacts 24, 25 and 26, the contacts being so disposed and the lever being movable to cause the contact 24 to bridge the tail light gap 22, and the contacts 25 and 26 to bridge either the headlight circuit gaps 12 and 14 or the side front light circuit gaps 17 and 19. In no event, however, will the switch lever effect a closing of both the headlight and front sidelight gaps at the same time. The contact member of the tail light circuit gap 22 are preferably prolonged so that the bridging contact 24 of the switch lever will remain in continual bridging relation to the gap when in either headlight or front sidelight circuit closing position and while moving from one to the other of such positions.

For the purpose of the signal feature of my invention I provide a normally operable signal control switch lever, the control member 30 of which is shown, in the present instance, as being in the form of a pivoted or lever member. This switch is in permanent electrical connection with the positive side of the battery 8, such connection in the present instance being to the circuit 11 at the battery side of the gap 12 therein. At one side of the switch member 30, or in position for such member when moved in one direction to have contact therewith, are three contacts 32, 33 and 34, while at the other side of the switch member in position to have contact therewith when the member is moved in the opposite direction are three contacts 35, 36 and 37.

The controls for the main and signal lighting circuits may be mounted in any suitable position convenient of access to the driver of the vehicle, and, in the present instance, are shown as mounted above the steering wheel 50 of the vehicle to a stationary member concentric with the steering post to which the wheel is attached. The details of such mounting are not necessary to be shown as it is well-known in the art and nothing novel is claimed therefor. The signal control member 30 projects within an insulated casing 51, being pivoted at its inner end within such casing on a binding post 52 for horizontal switching movements and projecting at its outer end in accessible position without the casing. The lead 31 is connected to the post 56. The headlight contacts 32 and 35 are mounted on the bottom of the casing to the right and left of the neutral position of the lever, and the contacts 33 and 34 are mounted in the casing side at the left of the lever, while the contacts 36 and 37 are mounted in the casing side at the right of the lever. Binding posts are connected to each of the contacts for attaching the signal circuit wires thereto.

The inner end of the control lever 30 comprises a socket member 30$^a$ in which the inner end of the lever is mounted for a quarter turning movement, such movement being limited by a pin 53 on the lever working within a slot 54 in the side-wall of the socket member 30$^a$. The lever member is yieldingly held against turning by the pressure of a coiled expansion spring 55 against its inner end, such spring being mounted within the socket member. The lever at a point thereon above the headlight contacts 32 and 35 is provided at one side thereof with a lateral projection 56, which, when the lever is in one position of its turning movement relative to the socket 30ª, is adapted to make contact with either headlight contacts 32 and 35, depending on the direction in which the lever is swung, and when the lever is turned to another position, relative to its socket member, the projection 56 is thrown out of contacting relation to the headlight contacts 32 and 35. It is thus evident that the signal circuits for the headlights 1 and 2 may be thrown out of commission or rendered inoperative by a turning of the lever 30 so that its projection 56 assumes the dotted line position, shown in Fig. 2. The lever 30 projects through a slot 30' in the front end of the casing 51 so that the lever oscillates in a single plane only, thereby holding the lever and its projection 52 from dropping downwardly to engage contacts 38 and 39. Thus the lever can be engaged with these contacts only by rotating same.

I wish it understood that my invention is not limited to any particular arrangement or form of the parts, or to the particular wiring illustrated, as different features of the invention are capable of numerous modifications and changes without departing from the spirit of the claims.

Having thus described my invention, what I claim as new and desire to secure by Letters Patent, is:—

1. In a switch, a casing, spaced opposed contacts in the casing, a lever arranged in the space between the contacts, a socketed element pivoted to an end of the casing and receiving an end of the lever therein, said element having a peripheral curved transverse slot extending into the socket thereof, a pin carried by said end of the lever and extending into the slot, a spring in the socket engaging said end of the lever to tension the latter, a lateral projection on the lever, and contacts carried by the bottom of the casing and underlying the lever for engagement with the lever projection upon rotating movement of the lever.

2. In a switch, a lever, means to rotatably and pivotally mount the lever at one end thereof, contacts on opposite sides of the lever engageable therewith upon movement of the lever in opposite directions, a radial projection on the lever, other contacts disposed in a plane parallel to the plane in which the lever operates and engageable with said projection upon rotation of the lever, and means engaging diametrically opposed points on the opposite end of the lever to guide the lever so that same can be oscillated in a single plane only.

3. In a switch, a lever, means to rotatably and pivotally mount the lever, contacts on opposite sides of the lever engageable therewith upon movement of the lever in opposite directions, a radial projection on the lever, other contacts disposed in a plane parallel to the plane in which the lever operates and engageable with said projection upon rotation of the lever, and means engaging diametrically opposed points on a portion of the lever to guide the lever so that same can be oscillated in a single plane only.

In testimony whereof I have hereunto signed my name to this specification.

WALTER L. SLAYTON.